March 21, 1961  A. B. FREEMAN  2,976,198
METHOD OF MAKING TUBE-LIKE ARTICLES AND PARTS THEREOF
Filed May 21, 1959  2 Sheets-Sheet 1

INVENTOR.
ARNOLD B. FREEMAN
BY
ATTORNEY

March 21, 1961 A. B. FREEMAN 2,976,198
METHOD OF MAKING TUBE-LIKE ARTICLES AND PARTS THEREOF
Filed May 21, 1959 2 Sheets-Sheet 2

*INVENTOR.*
ARNOLD B. FREEMAN
BY
ATTORNEY

United States Patent Office 2,976,198
Patented Mar. 21, 1961

2,976,198

METHOD OF MAKING TUBE-LIKE ARTICLES AND PARTS THEREOF

Arnold B. Freeman, Akron, Ohio, assignor to Goodyear Aircraft Corporation, Akron, Ohio, a corporation of Delaware Filed May 21, 1959, Ser. No. 814,736

3 Claims. (Cl. 154—81)

This invention relates to the manufacture of molded articles having parallel or substantially parallel fibers extending therethrough and is especially useful where it is desired to provide a molded body, for example, a tube, having a curved wall of considerable thickness in which fibers extend substantially normal to the wall surfaces.

In the manufacture of elongated bodies of laminated fibers and plastic material having curved relatively thick walls, for example, a tube, in which the fibers extend substantially normal to the curved wall surfaces it has been found difficult to orient the fibers in the desired directions.

The present invention aims to overcome the foregoing difficulty by forming wedge-shaped bodies of parallel fibers and uncured plastic material in which the fibers extend from the thin edge to the thick edge and then assembling a number of such wedge-shaped bodies and molding them into a single body.

It is an object of the invention to form such wedge-shaped bodies.

Other objects are to form such wedge-shaped bodies with a minimum of waste, to provide simplicity of procedure and to obtain an article, such as an elongated thick-walled tube, in which the fibers will extend substantially radial of its walls.

These and other objects will appear from the following description and the accompanying drawings forming a part hereof.

Figure 1:
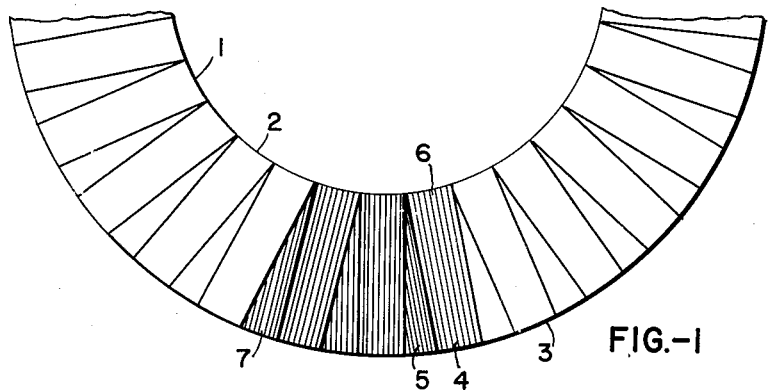
Fig. 1 is a cross-sectional view, partially broken away, of a curved wall, for example, of a tube, having fibers extending radial thereof or normal to its curved surfaces.

Referring to the drawings, and first to Fig. 1 thereof, this shows a curved wall 1, for example, of a tube, having an inner concave face 2 and an outer convex face 3. The wall is made up of axially extending approximately rectangular units 4 having parallel side faces and wedge-shaped units 5 arranged alternately. The rectangular units are made up of laminations of plastic impregnated fibers 6 which extend in a direction substantially normal to the inner and outer surfaces of the wall with their ends exposed at the inner and outer faces. It may be said that the fibers extend substantially radially of the tube-like structure. The wedge-shaped units 5 are also made up of laminations of plastic impregnated fibers 7, each lamination being of width differing from adjacent laminations but with all the ends of the fibers exposed at the convex face of the wall and the thick margin of the wedge while at least one layer of fibers extends entirely through the wedge from margin to margin. In Fig. 1 one wedge member 5 is inserted between two adjacent parallel sided members 4 so that the members 4 and 5 are alternated. It will be understood that where curvature of the wall is to be of greater radius the number of wedge members 5 may be decreased and the number of parallel members 4 increased. Likewise, when the curvature of the wall is to be of lesser radius, the number of wedge members 5 may be increased and the number of parallel members 4 decreased. It will, of course, be evident that the wall can be formed entirely of the wedge members 5 and the radius controlled by variation of the wedge angle.

To provide the wedge-shaped members, continuous fibers such as fibers of glass, quartz or ceramic material are laid in substantially parallel relation and united to each other by an uncured plastic material such as a phenolic resin, epoxy resin or other resin materials which may be applied by dipping, spraying or as sheet material laid thereupon, to form a ply or lamination 8. A number of such sheets may be adhered to each other face to face as in Fig. 2 to provide a slab 9 of laminations in which the fibers all extend in a single direction. The rectangular parallel sided members 4 may be cut from such a slab, or the slab 9 may itself be made of a size to constitute the member 4.

Figure 2:
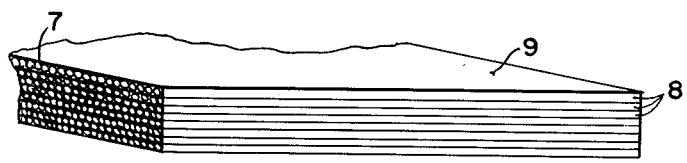
Fig. 2 is a perspective view of a portion of laminated slab of parallel fibers and plastic material.
Figure 3:
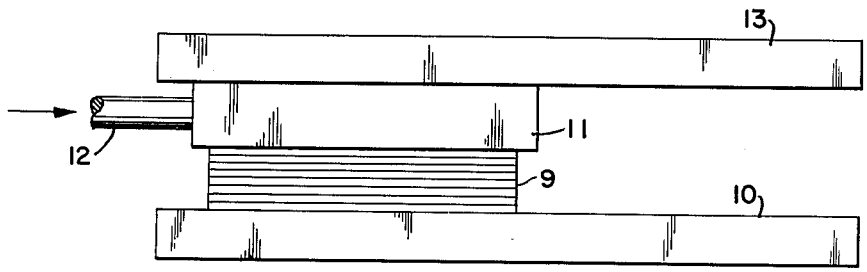
Fig. 3 is a side elevation of apparatus for progressively shifting the position of the plies of a laminated slab on each other, the slab being shown before shifting movement has taken place.

To provide the wedge-shaped members 5, a strip or slab 9 such as that shown in Fig. 2 is provided of an elongated length substantially equal to the length of the tubular article to be made and of a width in the direction of the length of the fibers substantially equal to the wall thickness of the tubular article to be made. The slab 9 may be placed on a plate 10 and under a block 11 movable in the direction of the arrow by pushing means 12. The block 11 is held down against the slab 9 by an upper plate 13 and pressure means may be provided on the upper plate to compress the slab 9.

Under slight pressure the upper face of slab 9 adheres to the block 11 and the lower face to the plate 10. Under such light pressure, the block 11 is advanced to the right as seen in Fig. 4 and the laminations of the slab are shifted upon each other or fanned out in the direction of their fibers into overlapping relation to such extent that the strip or slab assumes a lozenge or diamond shape in cross section.

Ordinarily, the plastic material uniting the fibers is readily flowable and acts to a certain extent as a lubricant so that the shifting operation may be done at room temperature. However, the slab or strip may be preheated to a temperature less than its curing temperature before the shifting operation. Also the plates 10 and 13 and block 11 may be heated to a temperature less than the curing temperature of the plastic. Usually no difficulty is experienced in obtaining sufficient friction between the strip or slab 9 and the plate 10 and block 11 to prevent slippage but such plate and block surfaces may be knurled or faced with fabric or other friction increasing surface.

Figure 4:
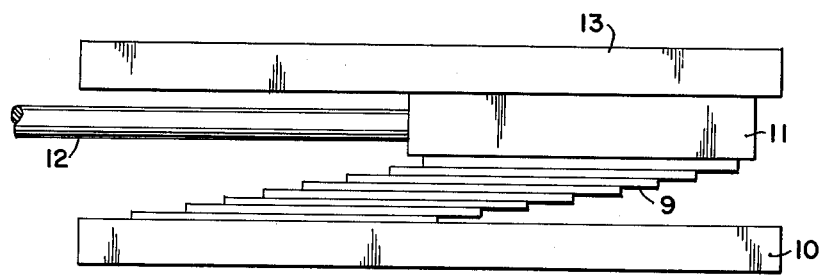
Fig. 4 is a similar view showing the apparatus at the end of the shifting movement.
Figure 5:
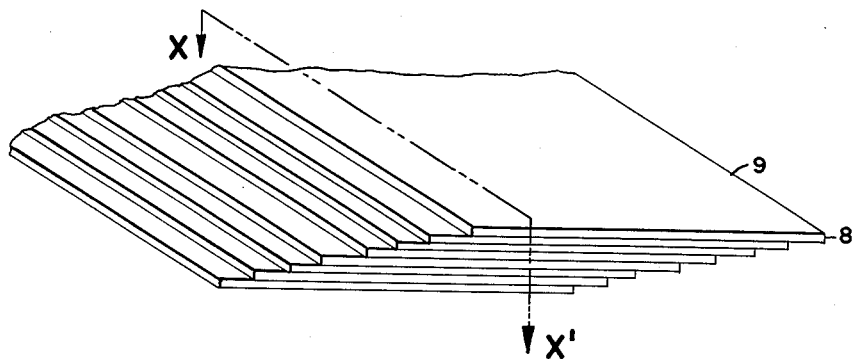
Fig. 5 is a perspective view of a portion of the shifted slab indicating how it may be divided to provide two strips of wedge cross section.

As seen in Figs. 4 and 5 the laminations 8 of the strip or slab 9 are now shifted on each other in shingled relation and the strip is generally diamond shaped or lozenge shaped in cross section. Such strip may then be split or cut along the plane x—x' as indicated in Fig. 5 resulting in production of two wedge-shaped strips such as that of Fig. 6.

Figure 6:
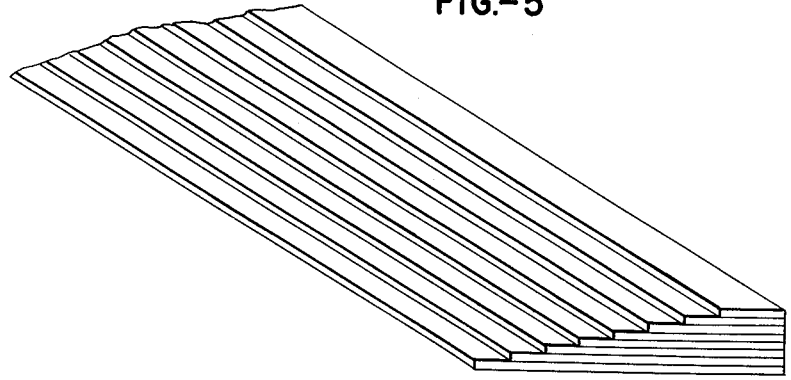
Fig. 6 is a perspective view of a portion of the wedge-shaped strips.

The wedge-shaped strips of Fig. 6 may be employed with rectangular pieces to build as in Fig. 1 a tubular or other body having a curved wall in which the laminations and their fibers are transverse of the wall, or may be used without rectangular pieces to form a similar body. Or a wedge-shaped strip of Fig. 6 can be wound on itself to form a bee-hive-like hemisphere. The assembly of strips may then be confined in a mold under heat and pressure sufficient to cure the resin material.

While a certain representative embodiment and details have been shown for the purpose of illustrating the invention, it will be apparent to those skilled in this art that various changes and modifications may be made therein without departing from the spirit or scope of the invention.

What is claimed is:

1. That method of making a tube-like article having relatively heavy walls which includes the steps of laying plies of parallel uncured resin-treated fibers upon each other to provide a laminated slab in which all of the fibers extend in a single direction, the fibers being of a length substantially equal to the radial thickness of the wall of the tube-like article and the slab of a length substantially equal to the length of the tube-like article, applying pressure against proposed faces of the slab in a direction to compress the plies against each other, relatively moving the pressure applying forces without releasing them and in a direction parallel to the axes of the fibers to shift the plies substantially equally upon each other with the uncured resin acting as a lubricant and to provide a slab of lozenge-shaped cross-section, the slab of shifted plies having a width substantially twice the width of the original slab, releasing the pressure, splitting the lozenge-shaped slab to provide a pair of elongated strips of triangular cross-section, repeating the first step of the operation to provide slabs of rectangular cross-section, repeating the operation to provide additional slabs of triangular cross-section, assembling the triangular strips and the rectangular strips to form a tube-like article with the fibers all extending substantially radially of the tube-like article, and molding the assembled material under heat and pressure to cure the resin.

2. That method of making a tube-like article having relatively heavy walls which includes the steps of laying plies of parallel uncured resin-treated fibers upon each other to provide a laminated slab in which all of the fibers extend in a single direction, the fibers being of a length substantially equal to the radial thickness of the wall of the tube-like article and the slab of a length substantially equal to the length of the tube-like article, applying pressure against opposed faces of the slab in a direction to compress the plies against each other, relatively moving the pressure applying forces without releasing them and in a direction parallel to the axes of the fibers to shift the plies substantially equally upon each other with the uncured resin acting as a lubricant and to provide a slab of lozenge-shaped cross-section, the slab of shifted plies having a width substantially twice the width of the original slab, releasing the pressure, splitting the lozenge-shaped slab to provide a pair of elongated strips of triangular cross-section, repeating the operation to provide additional slabs of triangular cross-section, and assembling the slabs to form a tube-like article wherein the fibers extend substantially normal to the walls.

3. That method of making an article which includes the steps of laying plies of parallel uncured resin-treated fibers upon each other to provide a laminated slab in which all of the fibers extend in a single direction, applying pressure against opposed faces of the slab in a direction to compress the plies against each other, relatively moving the pressure applying forces without releasing them and in a direction parallel to the axes of the fibers to shift the plies substantially equally upon each other with the uncured resin acting as a lubricant and to provide a slab of lozenge-shaped cross-section, releasing the pressure, and splitting the lozenge-shaped slab to provide a pair of elongated strips of triangular cross-section.

References Cited in the file of this patent

UNITED STATES PATENTS

| | | |
|---|---|---|
| 1,117,965 | Becker | Nov. 24, 1914 |
| 1,444,959 | Dickey | Feb. 13, 1923 |
| 1,601,911 | Godfrey | Oct. 5, 1926 |
| 2,806,810 | Beckwith | Sept. 17, 1957 |